No. 668,965.  
Patented Feb. 26, 1901.
L. J. VOGT.
PHOTOGRAPHIC SHUTTER.
(Application filed June 9, 1900.)
(Model.)  
8 Sheets—Sheet 1.
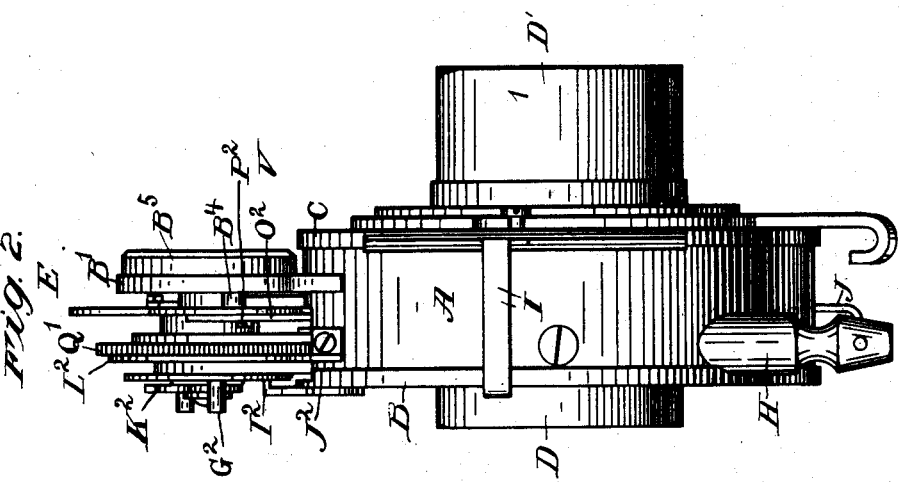
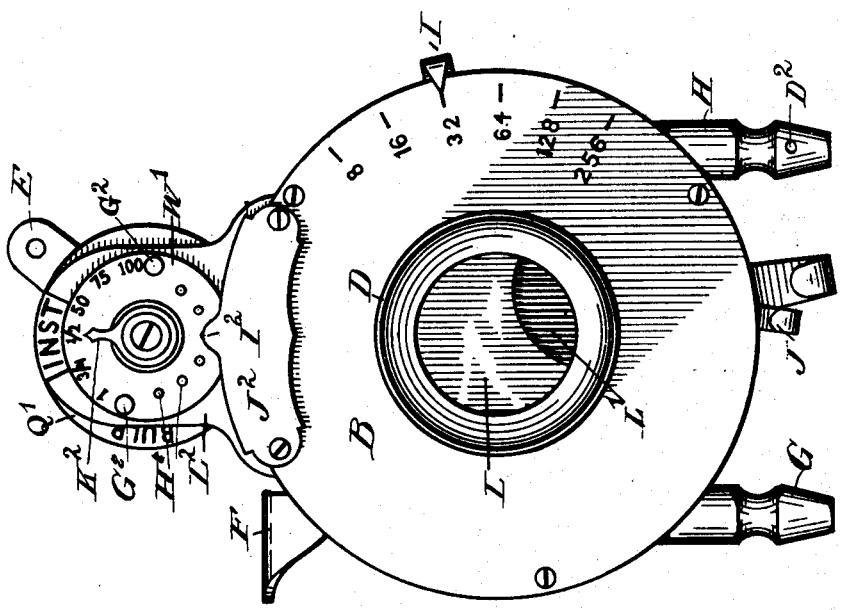
WITNESSES:  
J. E. Morey.  
L. C. Hills
INVENTOR.  
L. J. Vogt,  
BY Geo. B. Selden,  
ATTORNEY.

No. 668,965. Patented Feb. 26, 1901.
L. J. VOGT.
PHOTOGRAPHIC SHUTTER.
(Application filed June 9, 1900.)
(Model.) 8 Sheets—Sheet 2.
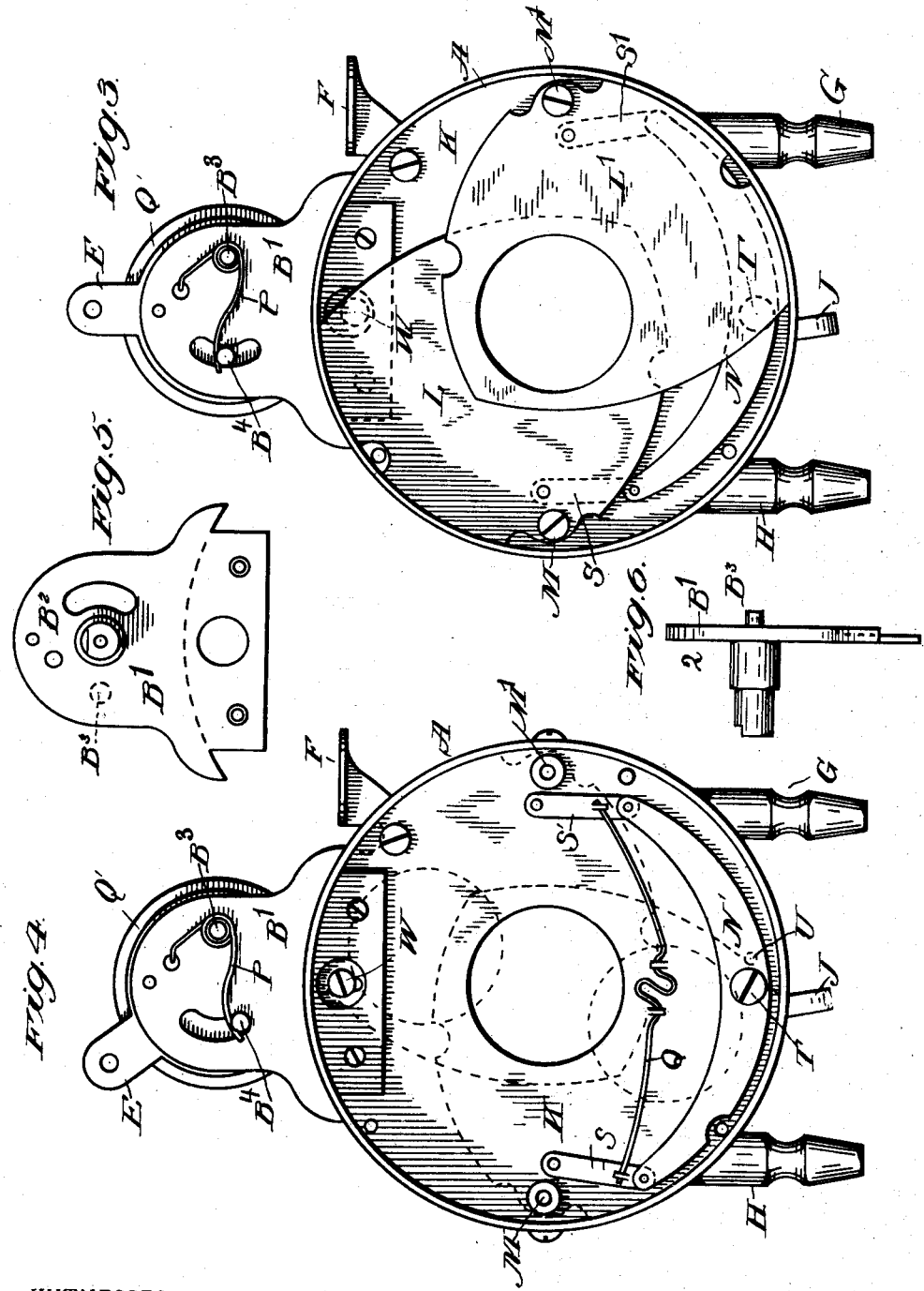
WITNESSES:
INVENTOR.
L. J. Vogt,
BY Geo. B. Selden,
ATTORNEY.

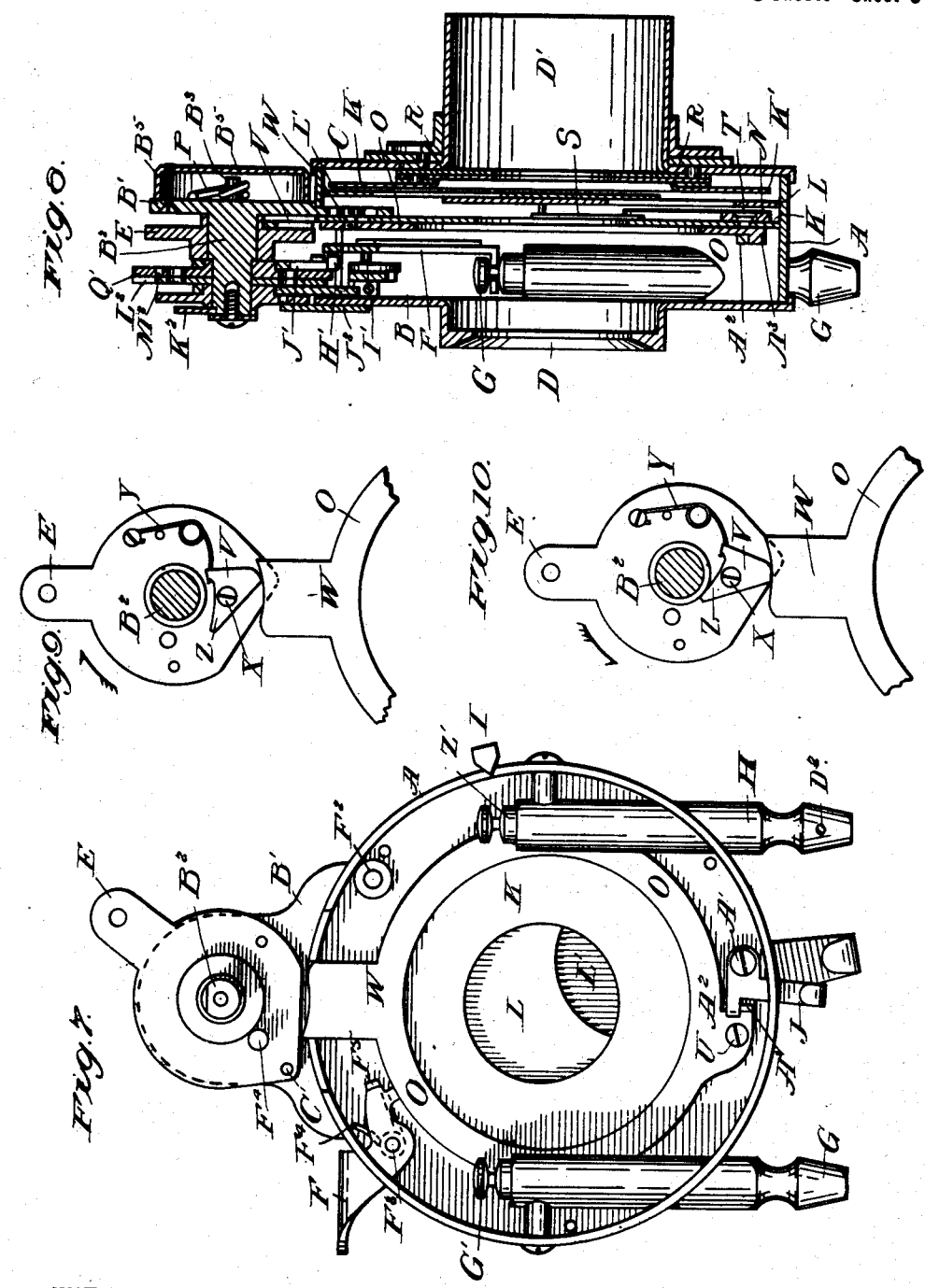

No. 668,965. Patented Feb. 26, 1901.
L. J. VOGT.
PHOTOGRAPHIC SHUTTER.
(Application filed June 9, 1900.)
(Model.) 8 Sheets—Sheet 4.
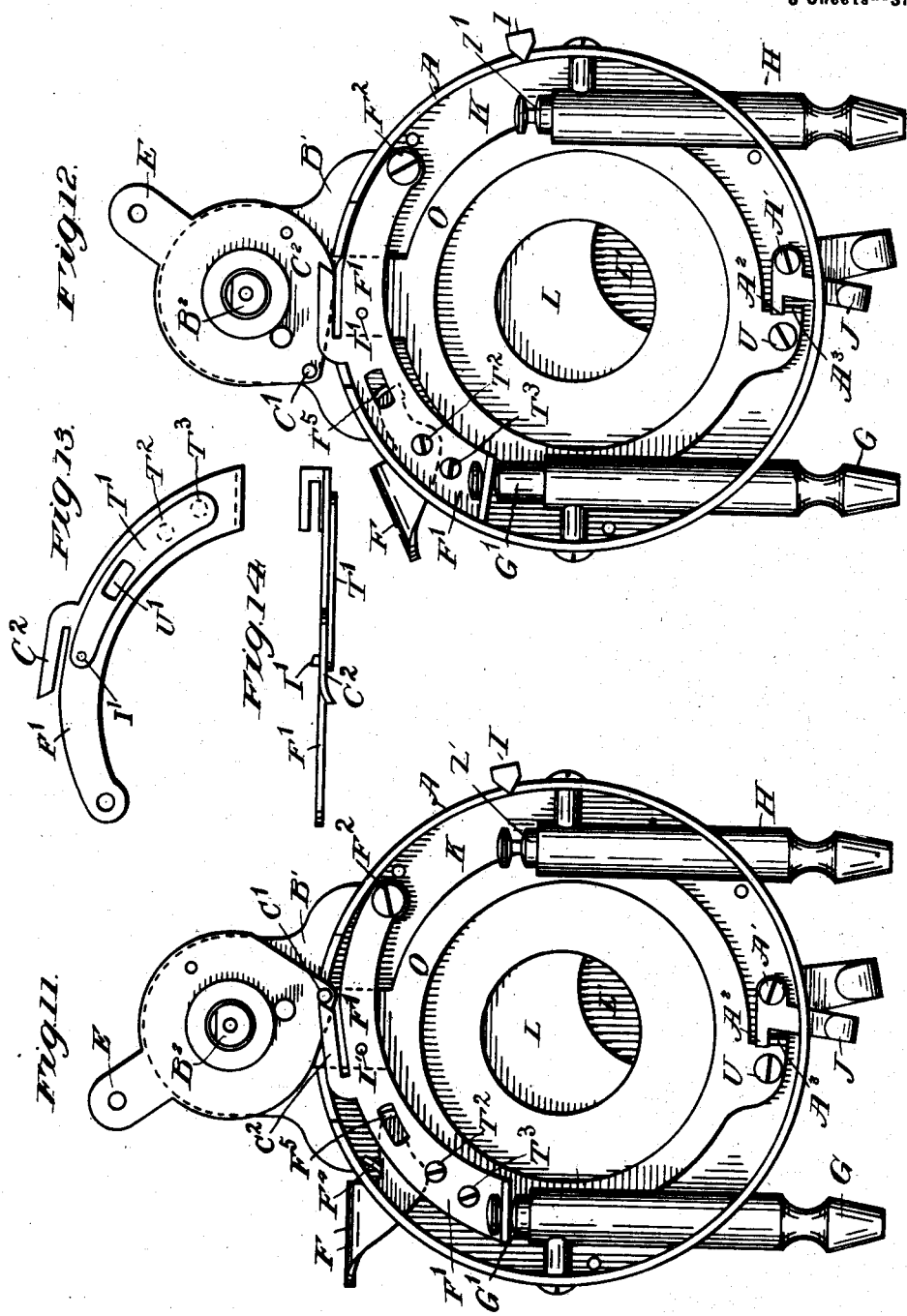
WITNESSES:
INVENTOR.
L. J. Vogt.
BY Geo. B. Selden,
ATTORNEY.

No. 668,965. Patented Feb. 26, 1901.
L. J. VOGT.
PHOTOGRAPHIC SHUTTER.
(Application filed June 9, 1900.)
(Model.) 8 Sheets—Sheet 5.
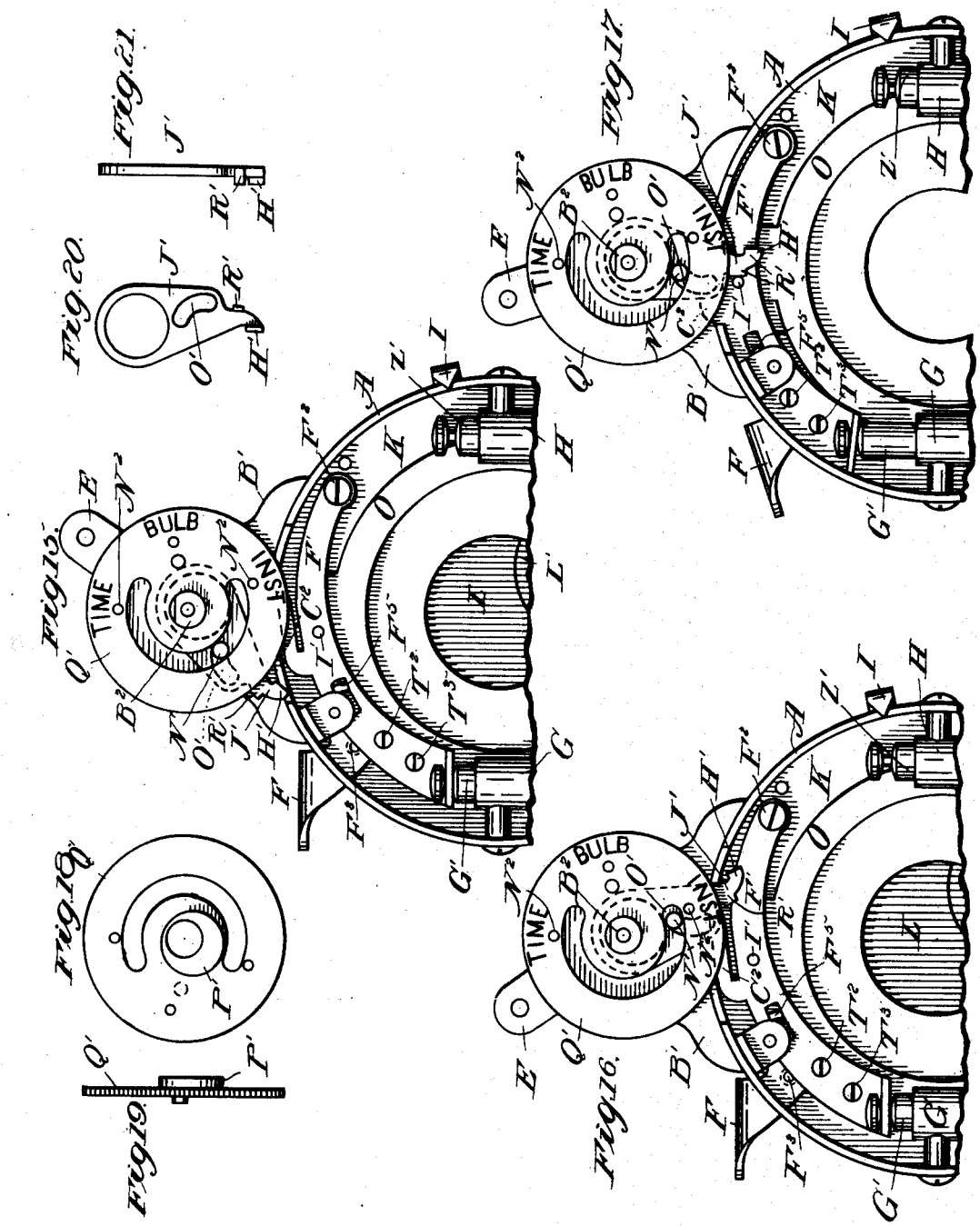
WITNESSES:
J. E. Morey
L. C. Hills
INVENTOR.
L. J. Vogt
BY Geo. B. Selden,
ATTORNEY.

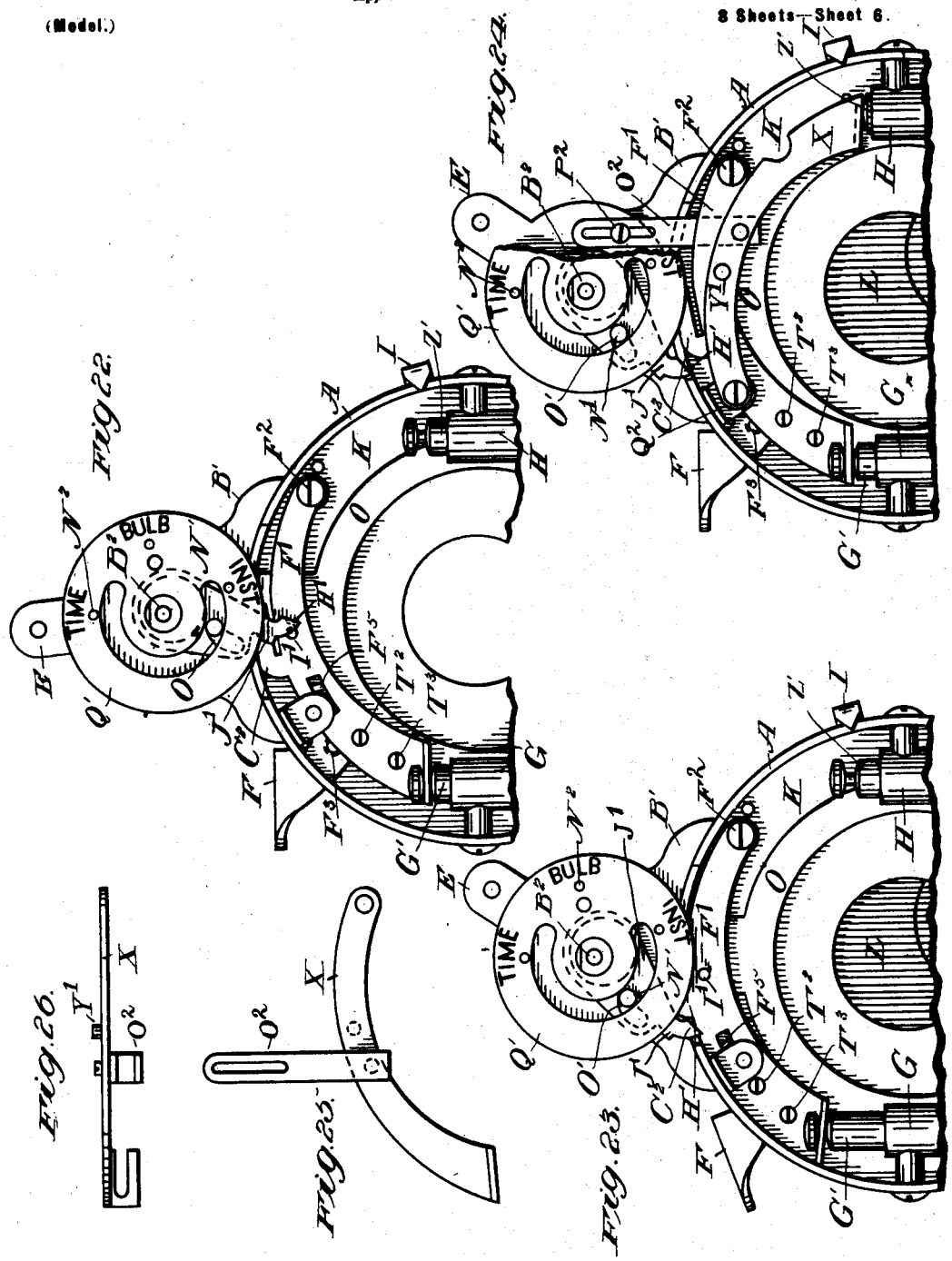

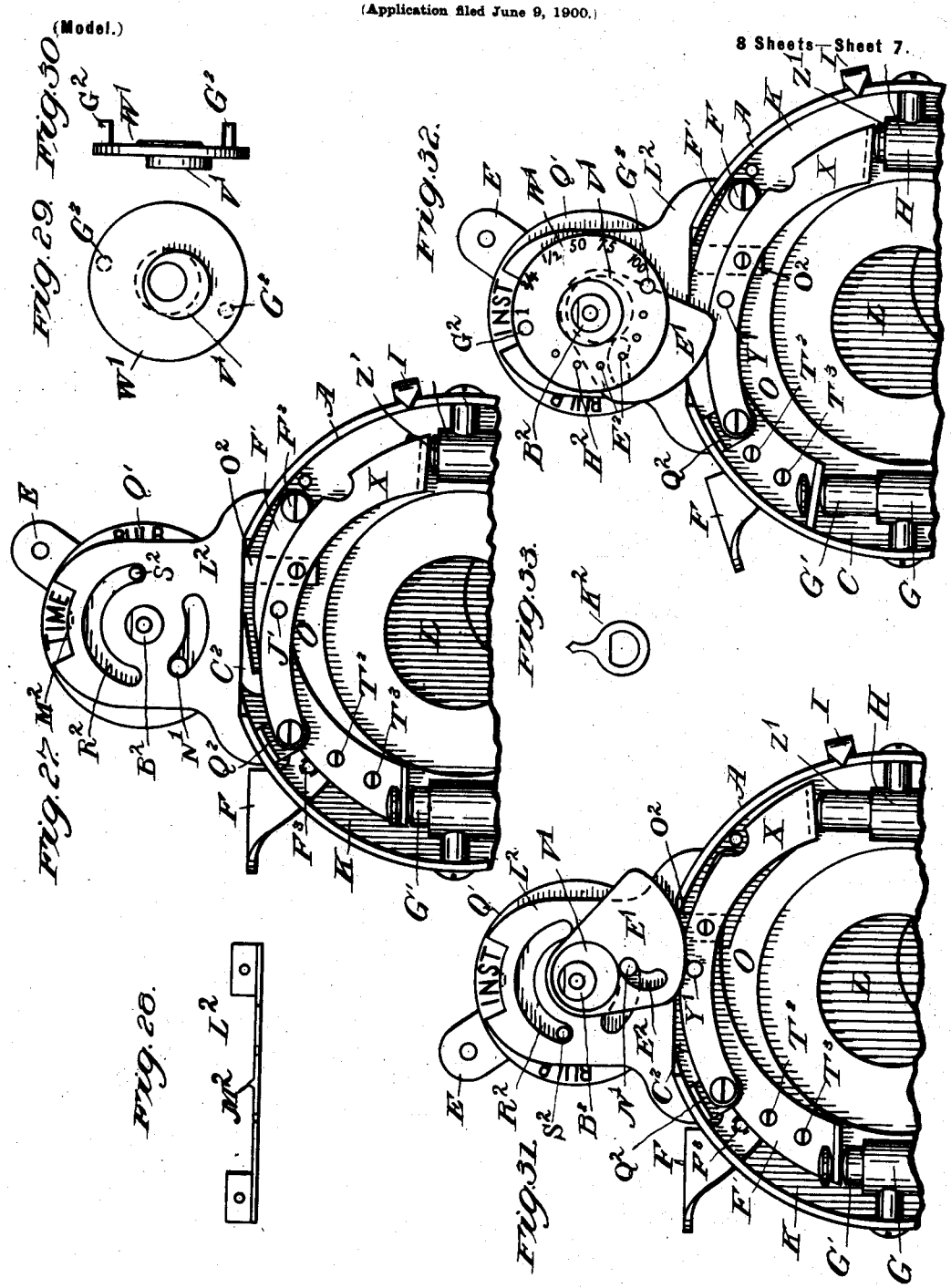

No. 668,965. Patented Feb. 26, 1901.
L. J. VOGT.
PHOTOGRAPHIC SHUTTER.
(Application filed June 9, 1900.)
(Model.) 8 Sheets—Sheet 8.
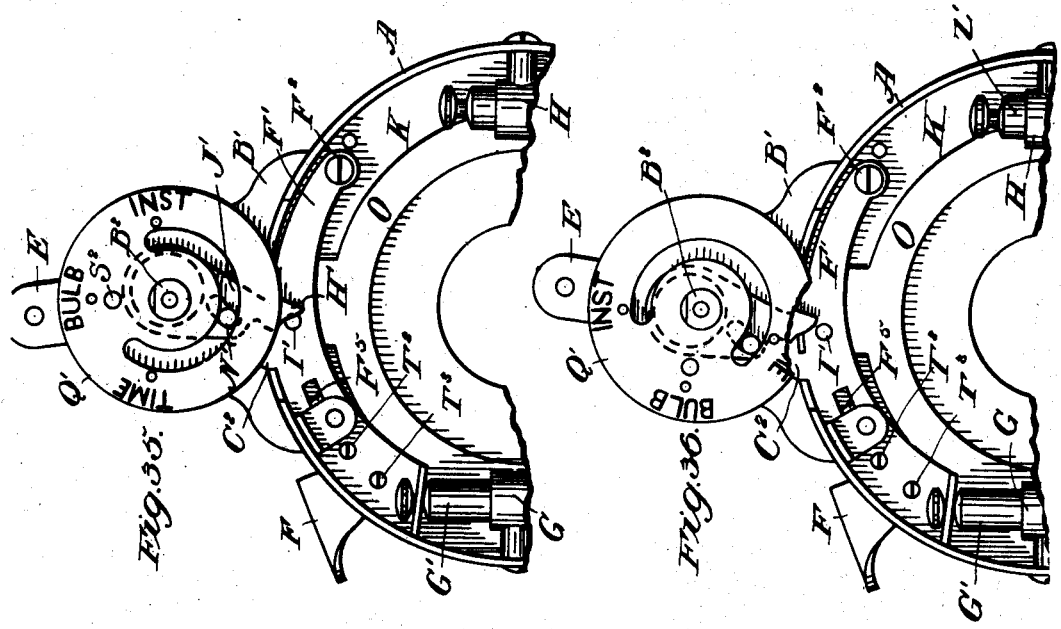
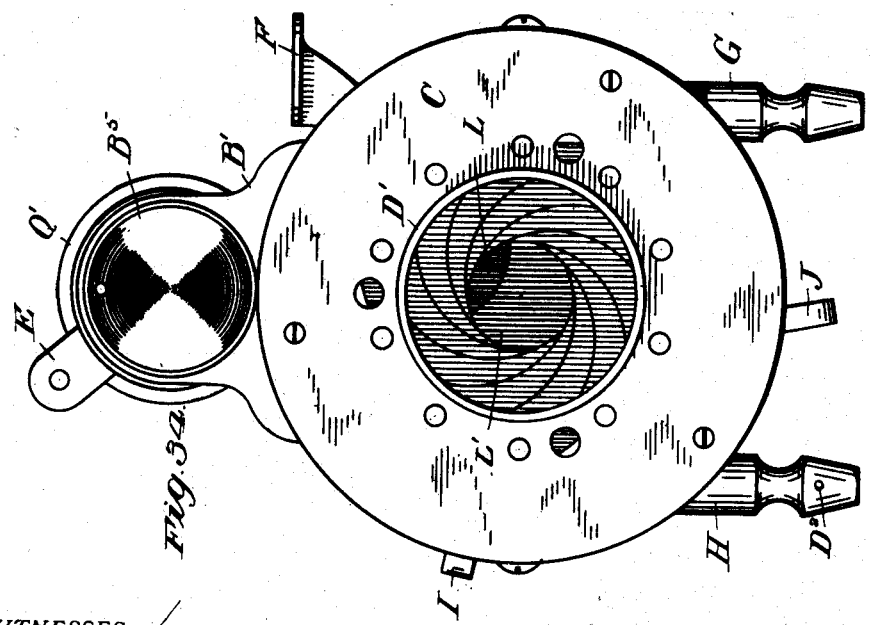
WITNESSES:
J. E. Morey
L. C. Hills
INVENTOR.
L. J. Vogt.
BY Geo. B. Selden,
ATTORNEY.

UNITED STATES PATENT OFFICE.

LOUIS J. VOGT, OF ROCHESTER, NEW YORK, ASSIGNOR TO VOGT OPTICAL COMPANY, OF SAME PLACE.

PHOTOGRAPHIC SHUTTER.

SPECIFICATION forming part of Letters Patent No. 668,965, dated February 26, 1901.

Application filed June 9, 1900. Serial No. 19,750. (Model.)

*To all whom it may concern:*

Be it known that I, LOUIS J. VOGT, a citizen of the United States, residing at Rochester, in the county of Monroe, in the State of New York, have invented an Improved Photographic Shutter, of which the following is a specification, reference being had to the accompanying drawings.

My invention relates to certain improvements in the construction and operation of photographic shutters, which improvements are fully described and illustrated in the following specification and the accompanying drawings, the novel features thereof being specified in the claims annexed to the said specification.

In the accompanying drawings, representing my improved shutter, Figure 1 is a front elevation. Fig. 2 is a side view as seen from the right hand in Fig. 1. Fig. 3 is a rear elevation, the rear plate being omitted, showing the blades in the open position. Fig. 4 is a rear elevation, the rear plate and the blades being omitted. Fig. 5 is a front elevation of the plate or support for the head. Fig. 6 is a side view of the same as seen from the right. Fig. 7 is a front elevation, the front plate being omitted. Fig. 8 is a central vertical section. Figs. 9 and 10 represent the main driving-lever and the pivoted dog in different positions as seen from the rear. Fig. 11 is a front elevation, the front plate being omitted, showing the shutter set for an exposure. Fig. 12 is a similar view after an exposure. Fig. 13 represents the release-lever as seen from the inside. Fig. 14 is a top view of the same. Fig. 15 is a partial front elevation showing the parts in the unset position. Fig. 16 represents the same parts in the set position. Fig. 17 represents the same during a time exposure at the first contact of the swinging arm with the pin on the releasing-lever. Fig. 18 is a rear elevation of the disk for changing from time to bulb or instantaneous exposures. Fig. 19 is an edge view of the same. Fig. 20 is a rear elevation of the adjustable swinging lever for time and bulb exposures. Fig. 21 is an edge view of the same. Fig. 22 represents the parts during a time exposure, showing the position the parts occupy next after the position indicated in Fig. 17. Fig. 23 represents the parts in the position they occupy after a time exposure. Fig. 24 represents the retarding-lever and connection. Fig. 25 represents the lever of the retarding device as seen from the rear. Fig. 26 is a top view of the same. Fig. 27 is a partial front view, the retarding-cam being omitted. Fig. 28 is a top view of the front support. Fig. 29 represents the disk and eccentric for adjusting the retarding device. Fig. 30 is an edge view of the same. Fig. 31 represents the retarding device in operation. Fig. 32 represents the same at the end of an exposure. Fig. 33 represents the pointer or indicator. Fig. 34 is a rear elevation. Fig. 35 is a front view representing the parts during a bulb exposure. Fig. 36 is a front view representing the parts during an instantaneous exposure.

My improved shutter is provided with a cylindrical casing A, having front and rear plates B and C, carrying tubes D D' for the lenses.

E is the setting-lever, which is shifted from right to left to compress the operating-spring, (see Figs. 1, 4, and 11,) and F the catch or thumb-piece which operates the release-lever.

G represents the pump for operating the shutter from a bulb, and H the cylinder of the retarding device.

I is a lever for adjusting the iris-diaphragm, and J a lever which holds the blades open during the operation of focusing.

K is a septum placed within the casing, and there is an additional septum K', Fig. 8, which still further prevents extraneous light from passing through the casing. The perforated exposing-blades L L', Figs. 1, 3, 4, and 8, are pivoted to the rear side of the septum at M M', Fig. 3. The leaves L L' receive a vibrating motion from the oscillating lever N, which is caused to vibrate by the actuating arm or ring O, Figs. 7, 8, 9, and 10.

P, Figs. 3, 4, and 8, is the operating-spring, which opens the leaves, the spring Q, Fig. 4, being used to close them and to hold them closed. The septum K', Fig. 8, in the rear of the blades, serves to support the iris-diaphragm R. It may be attached to the rear plate C by screws and washers. The ends of the vibrating lever N are connected with the blades L L' by the pivoted links S S', Fig. 4. The spring Q is secured near its center to the diaphragm K in any suitable manner, and its free ends bear against lugs on the links S S' to give the blades the requisite movement for closing, to take up any lost motion, and to prevent their jarring open. The lever N is pivoted at T, Figs. 4 and 8, to the septum, and the pin or screw U, Figs. 4 and 7, passes through a slotted opening in the septum and attaches the arm O to the vibrating lever N. When the setting-lever E swings from left to right under the influence of the spring P, (see Figs. 9 and 11,) the dog V of the driving-lever (shown in the rear views, Figs. 9 and 10) acts on the upper end of the arm O and forces it down, so as to vibrate the lever N by the pin U. The upper end of the ring is guided by a pin or screw W, Figs. 7 and 8, passing through a slot in the septum. The dog V is pivoted at X to the main driving-lever, being provided with a spring Y, which permits the dog to swing when the shutter is being set, but holds the arm Z on the dog against the boss on the lever during the exposure, so that the dog cannot turn, and therefore imparts the proper motion to the arm or ring O. The construction and operation will be readily understood from Figs. 9 and 10, which are rear views. In Fig. 10 the driving-lever, swinging in the direction of the arrow, causes the dog to push the arm O inward or downward, thereby operating the lever N and opening the blades.

In order to provide for holding the blades open for focusing, the lever J is pivoted to the septum at A', Fig. 7, and it is provided with lateral arm $A^2$, which bears against a lug $A^3$ on the arm O. By swinging the lower end of the lever J toward the right in Fig. 7 the arm $A^2$ draws the lug $A^3$ downward, shifting the position of the ring and the lever N and opening the blades, so that the light can pass freely through the lens. The lever J is made to move with friction sufficient to withstand the pull of the spring Q, Fig. 4, so that the blades will remain open until the lever is swung back to its normal position. This movement of the arm O produced by the lever J does not in any way interfere with the other parts of the shutter. Thus whether the shutter be set for time, bulb, or instantaneous exposures the blades can be opened and held open any requisite time by the lever J without changing or interfering in any way with the mechanism by which the shutter is set for the different exposures mentioned. The lever J may also be used for making exposures by a flash-light.

The support B' for the head of the shutter is attached to the septum K or the rear plate in any suitable manner and carries a stud $B^2$, on which the main driving-lever and other parts are supported. The operating-spring P, Figs. 3, 4, and 8, is coiled around a stud $B^3$ in the support B', and its free end bears upon a pin $B^4$, which passes through a curved slot in the support and is inserted in the main driving-lever. The spring P imparts the movement to the lever carrying the dog V, which operates the arm O to open the blades. The unset position of the spring and stud $B^4$ is represented in Fig. 4, while in Fig. 3 these parts are shown in mid-position. A head or cap $B^5$, Figs. 8 and 34, may be used to protect the spring. It will be understood, however, that any other suitable type of spring may be employed for this purpose.

Proceeding now to a description of the releasing mechanism, this will be understood from Figs. 11, 12, 13, and 14. The disk or driving-lever is provided with a pin C', which engages with a bent flexible hook $C^2$ on the releasing-lever F'. The releasing-lever is pivoted to the septum at $F^2$ and its free end is connected with the plunger G' of the pump G. When air is forced into the pump, the plunger G' rises and elevates the releasing-lever F' from the position of Fig. 11 to that of Fig. 12, and this movement carries the bent end of the hook $C^2$ above the pin C', allowing the pin C' to escape from engagement therewith by passing under it and permitting the driving-lever to shift from the set position of Fig. 11 to the unset position of Fig. 12, this movement operating the arm O and the blades, as already described, in consequence of the action of the dog V on the arm. During the setting operation the bent end of the hook $C^2$ springs outward, so as to allow the pin C' to pass behind it. An exposure may also be secured by pressing the thumb-piece F, which is pivoted to the septum at $F^3$, Fig. 7, and provided with a spring $F^4$, by which its inner end is given a tendency downward. The catch F is provided with a lug $F^5$, Figs. 7 and 11, which projects into a slot in the releasing-lever F'. By this arrangement the depression of the outer end of the catch F raises the releasing-lever and disengages the pin C' from the hook $C^2$, as already described.

The mechanism already described is that which is used for securing instantaneous exposures either from a bulb or by depressing the thumb-piece. To produce bulb exposures—that is, exposures where the blade remains open as long as the pressure is maintained on the bulb or the thumb-piece held in the depressed position—I employ the devices represented in Figs. 2, 8, 20, 21, and 35, which last figure represents the position of the parts during a bulb exposure, the blades being open and the releasing-lever F' elevated, so that the pin I' thereon arrests the movement of the adjustable swinging lever J' and the thumb-piece F being depressed. There is a lug H', Figs. 20 and 21, on the lower end of the lever J', which makes contact with the pin I' when the releasing-lever is elevated and holds the blades open by preventing the further movement of the lever until the releasing-lever is depressed, thereby disengaging the pin I' from the lug H', thus permitting the blades to close—that is, so long as the pressure is maintained on the bulb or on the thumb-piece the blades will be held open. The action of the operating-spring P is arrested while the lug H' is in contact with the pin I'. The lever J' is compelled to swing with the driving-lever by the pin N', inserted in the driving-lever and passing through a slot in the swinging lever. This slot O', Fig. 20, is made curved to keep the lever as near radial as possible, notwithstanding the action of the eccentric P', on which the lever is mounted, on the stud B². The eccentric is mounted on the rear side of a disk Q', Figs. 8, 15, 18, and 19, which disk is arranged to rotate on the stud B², so that the eccentric P' can move the lever J' radially in and out, thus changing the shutter from instantaneous to time or bulb exposures. The front of the disk Q' is provided with suitable marks adapted to show to the operator for what kind of an exposure the shutter is set. By turning the disk the lever J' is moved radially in or out, sliding on the pin N' in the slot O'. When the lever J' is drawn inward as far as possible, the shutter is set for instantaneous exposures, the lever swinging without making contact with the pin I'. When the lever swings in its partially-projected position, it is arrested by the pin I' in the position represented in Fig. 35, thus producing a bulb exposure.

For time exposures the lever J' is fully projected, so that the inner lug R', Figs. 17, 20, and 21, at first makes contact with the pin I' on the releasing-lever; but as soon as the releasing-lever has returned to its normal position the pin I' is disengaged from the lug R', the lever J' moves onward slightly, but is then arrested the second time by the lug H' coming in contact with the pin I', in which position the blades will remain open until the pin I' is released from the lug H' by another upward movement of the releasing-lever, which raises the pin I' above the lug H' and allows the lever to travel onward and the blades to close, the lug H' passing below the pin I'. The position of the parts during a time exposure, when the releasing-lever is down and the pin I' engaged with the lug H', is represented in Fig. 22. Fig. 23 represents the position of the parts at the end of a time exposure, the releasing-lever being shown still elevated. In order to permit the return movement of the lever J', the pin I' is made to slide through the releasing-lever by the construction shown in Figs. 13 and 14. T' is a spring attached to the rear side of the releasing-lever by screws T² T³. The pin I' is inserted in the free end of the spring and reaches through the lever, being beveled on its front end. During the operation of setting the shutter the lug H' presses the pin I' inward and passes over it, the spring T' yielding to permit this operation. The lug F⁵ on the thumb-piece F passes through a slotted opening U' in the spring T' to engage with a slot in the releasing-lever. (See Figs. 11 and 12.)

It remains to describe the retarding device, which consists of a cam E', arranged to swing on the eccentric V' on the disk W', arranged to rotate on the stud B², the retarding-lever X, and the pump H and the plunger Z'. The operation of the retarding device will be best understood from Figs. 31 and 32, in the first of which the curved edge of the cam is shown in contact with the pin Y', inserted in the lever X, which is in its elevated position. As the cam moves on from right to left in Fig. 31 it gradually depresses the lever X, forcing the plunger Z' downward in the cylinder H. The air escapes from the cylinder gradually through an opening D², Fig. 1, in the lower end, which opening may be provided with any suitable valve adapted to permit only the gradual escape of the air. The lower end of the plunger Z' is provided with a suitable packing, and the valve may consist of a soft rubber inserted in a recess in the lower end of the pump H, which recess is closed by a screw-plug at the lower end of the pump, having a discharge-passage D² formed through it. The retarding-cam is caused to swing by the pin N', which also operates the lever J'. As shown in Fig. 31, the cam E' is provided with a curved slot E², which receives the pin N'. When the retarding device is used, the length of the exposure will depend upon the point where the cam makes contact with the pin Y'. The cam may be withdrawn inward, so that it swings without making contact with the pin Y', in which condition the shutter will operate at its quickest speed. As the cam E' is moved radially outward by the eccentric V' the duration of the exposure will be increased until the longest exposure will be secured when the curved edge of the cam is in contact with the pin for the whole or nearly the whole of its swinging motion.

W', Figs. 29, 30, and 32, is a rotatable disk supported by the stud B², which carries the eccentric V', which supports the cam A'. This disk is provided with one or more knobs G², by which it is rotated to adjust the position of the cam radially. The edge of this disk may be provided with any suitable marks adapted to indicate the time of an exposure, and a circular series of holes or notches H², Fig. 32, is made in the front side of the disk W', and a point I², Fig. 2, on a plate J², Figs. 1, 2, and 8, attached to the front plate, engages with any one of the holes H² and serves to hold the disk W' in any position in which it may be set. The pointer K², Figs. 1, 2, 8, and 33, is attached to the stud B² and serves to indicate the speed of the shutter in accordance with the marks on the disk W' and also prevents the disk from turning during the operation of the shutter. The plate J' is attached to the front of the shutter in any suitable manner. The forward end of the stud B² is supported by a plate L², Figs. 1, 2, and 28, which plate is also provided with a point M², which engages with a series of holes N², Fig. 15, in the change-disk Q', so as to hold this disk in any position in which it may be set, with marks indicating time, bulb, or instantaneous exposures showing through a notch in the upper edge of the support L². (See the sectional view, Fig. 8.) The support L² is provided with a curved slot to permit the movement of the stud N', and it is attached to the casing A in any suitable manner.

In order to provide for raising the plunger Z' in the pump H, I employ the connection O², Figs. 24, 25, and 26, and a screw or pin P², Fig. 24, is inserted in the disk of the driving-lever, passing through a slot in the connection O². The retarding-lever X is pivoted to the casing on a suitable lug Q², Figs. 31 and 32, and when the setting-lever is shifted from right to left to set the shutter the pin P² moves upward in the slot in the connection O² and raises the retarding-lever from the position shown in Fig. 32 to the position shown in Fig. 31, so that the pin Y' is brought into position to contact with the edge of the retarding-cam as it swings toward the left during an exposure. The support L² is provided with a curved slot R², Figs. 27 and 31, with which a stud S² on the changing-disk engages, so as to limit the adjustment which may be given to the disk.

I claim—

1. In a photographic shutter, the combination with the casing, apertured blades pivoted in said casing, and means for vibrating said blades to open and close the same; of an independent lever arranged to open the blades and hold them open for focusing, substantially as described.

2. In a photographic shutter, the combination with the casing, apertured blades pivoted in said casing, means for opening said blades, and a spring for closing the blades; of an independent lever arranged to open the blades and hold them open for focusing, substantially as described.

3. In a photographic shutter, the combination with the casing, apertured blades pivoted in said casing, a vibrating lever also pivoted in said casing and connected with said blades, and a spring connected with said lever for closing the blades; of an independent lever adapted to open the blades and hold them open for focusing, substantially as described.

4. In a photographic shutter, the combination with the casing, apertured blades pivoted in said casing, a vibrating lever also pivoted in said casing and connected with said blades, means for opening said blades, and a spring connected with said lever for closing the blades; of an independent lever adapted to open the blades and hold them open for focusing, substantially as described.

5. In a photographic shutter, the combination with the casing, apertured blades pivoted in said casing, a vibrating lever also pivoted in said casing, links pivoted to the ends of said lever and to the blades, means for opening said blades, and a spring for closing the blades; of an independent lever adapted to open the blades and hold them open for focusing, substantially as described.

6. In a photographic shutter, the combination with the casing, apertured blades pivoted in said casing, a vibrating lever also pivoted in the casing and connected with the blades, a curved bar connected with the said lever for opening the blades, and a spring for closing the blades; of an independent lever adapted to move said bar to open said blades and hold them open for focusing, substantially as described.

7. In a photographic shutter, the combination with the casing, apertured blades pivoted in said casing and means for moving said blades to produce instantaneous exposures; of an independent lever adapted to open said blades and hold them open for focusing, substantially as described.

8. In a photographic shutter, the combination with the casing, apertured blades pivoted in said casing, a curved bar extending across said casing and arranged to actuate said blades, and means for moving said blades to produce instantaneous exposures; of an independent lever adapted to engage said curved bar to open the blades and hold them open for focusing, substantially as described.

9. In a photographic shutter, the combination with the casing, apertured blades pivoted in said casing, a curved bar extending across said casing and arranged to actuate said blades, means for moving said bar to open said blades, and a spring for closing said blades; of an independent lever arranged to engage said bar to open said blades and hold them open for focusing, substantially as described.

10. In a photographic shutter, the combination with the casing, apertured blades pivoted in said casing, a vibrating lever also pivoted in said casing and connected with said blades, and a spring for closing the blades; of a curved bar extending across the casing and connected with said vibrating lever, and means for actuating said curved bar to open said blades, substantially as described.

11. In a photographic shutter, the combination with the casing, apertured blades pivoted in said casing, a vibrating lever also pivoted in said casing and connected with said blades, and a spring for closing the blades; of a curved bar extending across the casing and connected with said vibrating lever, a spring-actuated driving-lever, and a spring-actuated dog on said driving-lever, adapted to engage said curved bar and open said blades when the driving-lever moves in one direction, substantially as described.

12. In a photographic shutter, the combination with the exposing mechanism; of a spring-actuated driving-lever for operating said exposing mechanism, a pin C' on said lever, a releasing-lever having a yielding hook adapted to engage said pin C', and a pivoted thumb-piece arranged to operate the releasing-lever, substantially as described.

13. In a photographic shutter, the combination with the exposing mechanism; of a spring-actuated driving-lever for operating said mechanism, a pin C' and a stud N' on said driving-lever, a radially-adjustable stop-arm pivoted eccentrically with relation to the driving-lever, and guided on the said stud N', lugs on the stop-arm, and a releasing-lever having a yielding hook to engage the pin C' and a pin to engage the lugs on the stop-arm, substantially as described.

14. In a photographic shutter, the combination with the casing and the exposing mechanism; of a spindle on the said casing, a spring-actuated driving-lever mounted on said spindle and arranged to actuate the exposing mechanism, a pin C' and a stud N' on said driving-lever, a change-disk having an eccentric mounted on said spindle, a stop-arm mounted on said eccentric and guided on the stud N' and having lugs on its outer end, a releasing-lever having a yielding hook to engage the pin C', a yielding pin on said releasing-lever to engage the lugs on the arm, and means for operating said releasing-lever, substantially as described.

15. In a photographic shutter, the combination with the casing and the exposing mechanism, a spring-actuated driving-lever pivoted in the said casing and adapted to actuate the exposing mechanism, and having a stud N', means for holding said driving-lever when set, and means for releasing the same; of a retarding-cam pivoted eccentrically with relation to the said driving-lever, and guided on the stud N', a retarding-lever having a stud to engage the retarding-cam, a plunger connected with said retarding-lever, and a cylinder to receive said plunger, said cylinder having a restricted aperture for the escape of air, substantially as described.

16. In a photographic shutter, the combination with the casing and the exposing mechanism, a spring-actuated driving-lever pivoted in the said casing and adapted to actuate the exposing mechanism, and having a stud N', means for holding said driving-lever when set, and means for releasing the same; of a retarding-cam pivoted eccentrically with relation to the said driving-lever, and guided on the stud N', a retarding-lever having a stud to engage the retarding-cam, and a pneumatic retarding device connected with said retarding-lever, substantially as described.

17. In a photographic shutter, the combination with the casing and the exposing mechanism, a spindle on the said casing, a spring-actuated driving-lever mounted on said spindle, and arranged to actuate the exposing mechanism, a stud N' on said driving-lever; of a disk W' provided with an eccentric mounted on the said spindle, a retarding-cam mounted on said eccentric and guided by the stud N', a retarding-lever having a stud adapted to engage said retarding-cam, and a pneumatic retarding device connected with said retarding-lever, substantially as described.

18. In a photographic shutter, the combination with the casing and the exposing mechanism, a spindle on the said casing, a spring-actuated driving-lever mounted on said spindle, and arranged to actuate the exposing mechanism, a stud N' on said driving-lever; of a disk W' provided with an eccentric mounted on the said spindle, means for holding said disk in any desired position, a retarding-cam mounted on said eccentric and guided by the stud N', a retarding-lever having a stud adapted to engage said retarding-cam, and a pneumatic retarding device connected with said retarding-lever, substantially as described.

19. In a photographic shutter, the combination with the casing and the exposing mechanism, a spindle on the said casing, a driving-lever mounted on said spindle, and adapted to actuate the exposing mechanism, and a stud N' on said driving-lever; of a rotatable change-disk having an eccentric mounted on said spindle, an adjustable stop-arm operated by said eccentric, and provided with lugs at its free end, and guided by the stud N' on the driving-lever, a rotatable time-disk also having an eccentric mounted on said spindle, an adjustable retarding-cam operated by said eccentric and guided by the stud N' on the driving-lever, a retarding-lever having a stud adapted to engage the said retarding-cam, and a pneumatic retarding device connected with the said retarding-lever, substantially as described.

20. In a photographic shutter, the combination with the casing and the exposing mechanism, a spindle on the said casing, a driving-lever mounted on said spindle, and adapted to actuate the exposing mechanism, and a stud N' on said driving-lever, means for retaining the driving-lever in its set position and for releasing the same; of a rotatable change-disk having an eccentric mounted on said spindle, an adjustable stop-arm operated by said eccentric and provided with lugs at its free ends, and guided by the stud N' on the driving-lever, a rotatable time-disk also having an eccentric mounted on said spindle, an adjustable retarding-cam operated by said eccentric and guided by the stud N' on the driving-lever, means for holding the disks in any desired position, a retarding-lever having a stud adapted to engage the said retarding-cam, and a pneumatic retarding device connected with the said retarding-lever, substantially as described.

21. In a photographic shutter, the combination with the casing and the exposing mechanism, a supporting-arm upon said casing, a spindle on the supporting-arm, and a spring-actuated driving-lever mounted on said spindle and arranged to actuate the exposing mechanism; of a rotatable time-disk provided with an eccentric, a retarding-cam operated by said eccentric, a retarding-lever having a stud to engage said retarding-disk, a plunger connected with said retarding-lever, and a cylinder adapted to receive said plunger and having a suitable air-vent, substantially as described.

22. In a photographic shutter, the combination with the casing and the exposing mechanism, a supporting-arm upon said casing, a spindle on the supporting-arm, and a spring-actuated driving-lever mounted on said spindle and arranged to actuate the exposing mechanism; of a rotatable disk provided with a series of holes, an eccentric on said time-disk, a plate on the casing having an elastic part adapted to engage with any of said holes, a retarding-cam operated by said eccentric, a retarding-lever having a stud to engage said retarding-disk, a plunger connected with said retarding-lever, and a cylinder adapted to receive said plunger and having a suitable air-vent, substantially as described.

23. In a photographic shutter, the combination with the exposing mechanism; of a spring-actuated driving-lever arranged to actuate said exposing mechanism, an adjustable retarding-cam arranged to turn with said driving-lever, a retarding-lever having a stud adapted to engage said retarding-cam, a connection between the retarding-lever and the driving-lever whereby the former is raised when the latter is set, and a pneumatic retarding device connected with said retarding-lever, substantially as described.

24. In a photographic shutter, the combination with the casing and the exposing mechanism, and means for setting the same; of a releasing-lever having an aperture therethrough, a spring on one side of said releasing-lever, and a stud on said spring projecting through said aperture, substantially as described.

25. In a photographic shutter, the combination with the casing and the exposing mechanism, and means for setting the same; of a releasing-lever having a slot therethrough, and a thumb-piece pivoted in said casing and having a lug at its inner end projecting into said slot in the releasing-lever, substantially as described.

26. In a photographic shutter, the combination with the exposing mechanism, of a spring-actuated driving-lever, a spring-actuated dog having an arm pivoted on said driving-lever and arranged to actuate said exposing mechanism, an adjustable stop-arm arranged to turn with said driving-lever and having lugs thereon, and means for intercepting and releasing said lugs, substantially as described.

27. In a photographic shutter, the combination with the exposing mechanism, of a spring-actuated driving-lever, a spring-actuated dog having an arm pivoted on said driving-lever and arranged to actuate said exposing mechanism, a change-disk pivoted concentric with said driving-lever and having an eccentric thereon, a stop-arm mounted on said eccentric and arranged to turn with said driving-lever, lugs on said stop-arm, and means for intercepting and releasing said lugs, substantially as described.

28. In a photographic shutter, the combination with the casing and the exposing mechanism, of a spring-actuated driving-lever pivoted in said casing, a spring-actuated dog pivoted on said driving-lever and arranged to open said exposing mechanism, a change-disk pivoted eccentric with said driving-lever and having an eccentric thereon, a stop-arm mounted on said eccentric and connected with said driving-lever to turn therewith, means for intercepting and releasing said stop-arm, and means for closing the exposing mechanism when said stop-arm is released, substantially as described.

29. In a photographic shutter, the combination with the casing the exposing-blades pivoted in the said casing, a spring-actuated driving-lever pivoted in the casing, and a spring-actuated dog on said driving-lever; of a movable operating-ring connected with said blades, a cam on said ring adapted to receive the pressure of said dog to open said blades, and means for closing said blades, substantially as described.

30. In a photographic shutter, the combination with the casing the exposing-blades pivoted in the said casing, a spring-actuated driving-lever pivoted in the casing, and a spring-actuated dog on said driving-lever; of a movable operating-ring connected with said blades, a cam on said ring adapted to receive the pressure of said dog to open said blades, a spring for closing the blades, a device for retaining said blades when fully open, and means for releasing said retaining device, substantially as described.

LOUIS J. VOGT.

Witnesses:
GEO. B. SELDEN,
J. M. SHERMAN.